United States Patent
Pruscino et al.

(10) Patent No.: US 7,209,990 B2
(45) Date of Patent: Apr. 24, 2007

(54) MAINTAIN FAIRNESS OF RESOURCE ALLOCATION IN A MULTI-NODE ENVIRONMENT

(75) Inventors: Angelo Pruscino, Redwood City, CA (US); Michael Zoll, Redwood City, CA (US); Wilson Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 11/099,771

(22) Filed: Apr. 5, 2005

(65) Prior Publication Data

US 2006/0224805 A1   Oct. 5, 2006

(51) Int. Cl.
G06F 13/36 (2006.01)
G06F 13/362 (2006.01)
G06F 9/46 (2006.01)
G06F 12/00 (2006.01)

(52) U.S. Cl. .............. 710/200; 710/108; 710/110; 718/104; 707/8; 709/226; 709/229; 711/147

(58) Field of Classification Search ............... 710/200, 710/110, 107, 108, 112, 52, 310; 718/104, 718/107; 707/8, 10; 709/217–218, 223–224, 709/208, 226, 229; 711/147
See application file for complete search history.

(56) References Cited

U.S. PATENT DOCUMENTS

| | | | |
|---|---|---|---|
| 4,435,766 A | 3/1984 | Haber et al. | |
| 4,769,772 A | 9/1988 | Dwyer | |
| 4,829,427 A | 5/1989 | Green | |
| 5,060,144 A | 10/1991 | Sipple et al. | |
| 5,091,852 A | 2/1992 | Tsuchida et al. | |
| 5,161,227 A * | 11/1992 | Dias et al. | 718/104 |
| 5,202,971 A | 4/1993 | Henson et al. | |
| 5,251,318 A | 10/1993 | Nitta et al. | |
| 5,285,528 A | 2/1994 | Hart | |
| 5,287,521 A | 2/1994 | Nitta et al. | |
| 5,325,525 A | 6/1994 | Shane et al. | |
| 5,394,531 A | 2/1995 | Smith | |
| 5,403,639 A * | 4/1995 | Belsan et al. | 707/204 |

(Continued)

FOREIGN PATENT DOCUMENTS

EP    286807 A2    10/1988

OTHER PUBLICATIONS

"Fast locks in distributed shared memory systems" by Hermannsson et al. (abstract only)☐☐Publication Date: Jan. 4-7, 1994.*

(Continued)

*Primary Examiner*—Gopal C. Ray
(74) *Attorney, Agent, or Firm*—Hickman Palermo Truong & Becker LLP

(57) ABSTRACT

Locks are placed in a convert queue in a way that compensates for queue bias. Rather than always placing a remote lock in a queue at the tail, a remote lock can be placed further up in the queue, and possibly be interleaved with local locks. As a result, remote processes are granted locks more frequently and swiftly. Locks are placed in a convert queue according based on queue placement factors, which are factors accounted for when placing a lock in a queue.

20 Claims, 4 Drawing Sheets

U.S. PATENT DOCUMENTS

| | | | |
|---|---|---|---|
| 5,408,653 | A | 4/1995 | Josten et al. |
| 5,432,919 | A | 7/1995 | Falcone et al. |
| 5,440,743 | A | 8/1995 | Yokota et al. |
| 5,442,763 | A | 8/1995 | Bartfai et al. |
| 5,452,447 | A | 9/1995 | Nelson et al. |
| 5,454,108 | A | 9/1995 | Devarakonda et al. |
| 5,511,178 | A | 4/1996 | Takeda et al. |
| 5,551,027 | A | 8/1996 | Choy et al. |
| 5,551,046 | A * | 8/1996 | Mohan et al. .................. 707/8 |
| 5,590,308 | A | 12/1996 | Shih |
| 5,596,754 | A | 1/1997 | Lomet |
| 5,612,865 | A * | 3/1997 | Dasgupta ..................... 700/79 |
| 5,619,675 | A | 4/1997 | De Martine et al. |
| 5,682,537 | A | 10/1997 | Davies et al. |
| 5,689,255 | A | 11/1997 | Frazier et al. |
| 5,761,659 | A | 6/1998 | Bertoni et al. |
| 5,778,442 | A | 7/1998 | Ezzat et al. |
| 5,832,484 | A | 11/1998 | Sankaran et al. .............. 707/8 |
| 5,845,318 | A | 12/1998 | Rose et al. |
| 5,892,945 | A * | 4/1999 | Mirchandaney et al. .... 718/104 |
| 5,893,086 | A * | 4/1999 | Schmuck et al. ............ 707/1 |
| 5,963,960 | A * | 10/1999 | Swart et al. ................ 707/202 |
| 5,963,963 | A * | 10/1999 | Schmuck et al. ........... 707/205 |
| 5,970,495 | A * | 10/1999 | Baru et al. .................. 707/102 |
| 5,999,712 | A * | 12/1999 | Moiin et al. ................ 709/220 |
| 6,023,706 | A * | 2/2000 | Schmuck et al. ........... 707/200 |
| 6,026,293 | A * | 2/2000 | Osborn ....................... 455/411 |
| 6,026,394 | A * | 2/2000 | Tsuchida et al. ............... 707/3 |
| 6,044,367 | A * | 3/2000 | Wolff ............................ 707/2 |
| 6,047,283 | A * | 4/2000 | Braun ........................... 707/3 |
| 6,052,697 | A * | 4/2000 | Bennett et al. ............. 707/205 |
| 6,101,495 | A * | 8/2000 | Tsuchida et al. ............... 707/4 |
| 6,144,983 | A * | 11/2000 | Klots et al. ................. 718/104 |
| 6,173,313 | B1 * | 1/2001 | Klots et al. ................. 709/203 |
| 6,185,601 | B1 * | 2/2001 | Wolff ........................ 709/203 |
| 6,209,074 | B1 * | 3/2001 | Dell et al. .................. 711/170 |
| 6,292,795 | B1 * | 9/2001 | Peters et al. .................... 707/3 |
| 6,353,836 | B1 | 3/2002 | Bamford et al. |
| 6,453,404 | B1 | 9/2002 | Bereznyi et al. |
| 6,668,295 | B1 | 12/2003 | Chan |
| 6,708,198 | B1 * | 3/2004 | Simmons et al. ........... 718/104 |
| 6,751,616 | B1 * | 6/2004 | Chan .............................. 707/8 |
| 2005/0149540 | A1 | 7/2005 | Chan et al. |
| 2006/0206901 | A1 * | 9/2006 | Chan .......................... 718/107 |
| 2006/0224805 | A1 * | 10/2006 | Pruscino et al. ............ 710/200 |

OTHER PUBLICATIONS

Aldred et al., "A Distributed Lock Manager or Fault Tolerant MPP," IEEE, 1995.

Apple, "OpenDoc Cookbook".

Bhide, Anupam, "An Analysis of Three Transation Processing Architectures," Proceedings of the 14th VLDB Conference, Los Angeles, CA., 1988.

Copeland, George et al., "Data Placement In Bubba," ACM, Mar. 1988.

Corba, "Corbaservices: Common Object Services Specification."

Dewitt, David J. et al, A Performance Analysis of the Gamma Database Machine, ACM, Mar. 1998.

Englert, Susanne, "A Benchmark of NonStop SQL Release 2 Demonstrating Near-Linear Speedup and Scaleup on Large Databases."

Hong Wei et al., "Optimization of Parallel Query Execution Plans in XPRS,", IEEE, Apr. 1991.

Molesky, Lory D. et al., "Database Locking Protocols for Large-Scale Cache-Coherent Shared Memory Multiprocessors: Design, Implementation and Performance," Jun. 6, 1995, pp. 1-24.

Molesky, Lory D.et al., "Efficient Locking for Shared Memory Database Systems," Mar. 1994, 28 pages.

Stonebaraker, Michael et al., "The Design of XPRS," Proceeding of the 14th VLDB Conference, Los Angeles, CA., 1988.

The Tandem Performance Group, "A Benchmark of NonStop SQL on the Debit Credit Transaction," ACM, Mar. 1988.

Office Action from European Patent Application No. 01968979.3-2212, dated Aug. 6, 2004 (3 pgs.).

Current Claims in European Patent Application No. 01968979.3-2212 (3 pgs).

Written Opinion from PCT Patent Application No. PCT/US02/06981 dated Oct. 3, 2004(8 pgs.).

Current Claims in PCT Patent Application No. PCT/US02/06981 (8 pgs.).

Office Action from Canadian Patent Application No. 2,448,050 dated Oct. 1, 2004 (2 pgs).

Current Claims in Canadian Patent Application No. 2, 448,050 (48 pgs).

* cited by examiner

MAINTAIN FAIRNESS OF RESOURCE ALLOCATION IN A MULTI-NODE ENVIRONMENT

FIELD OF THE INVENTION

The present invention generally relates to techniques for allocating resources. The invention relates more specifically to a techniques for maintaining fairness in resource allocation in a multi-node environment.

BACKGROUND

A multi-node computer system is made up of interconnected nodes that share access to resources. Typically, the nodes are interconnected via a network and share access, in varying degrees, to shared storage (e.g. shared access to a set of disk drives). The nodes in a multi-node computer system may be in the form of a group of computers (e.g. work stations, personal computers) that are interconnected via a network. Alternately, the nodes may be the nodes of a grid. A grid is composed of nodes in the form of server blades interconnected with other server blades on a rack.

The term resource herein refers to any resource used by a computer to which access between multiple processes is managed. Resources include units of memory, peripheral devices (e.g. printers, network cards), units of disk storage (e.g. a file, a data block), and data structures (a relational table, records of relational tables, a data block that holds records of a relational table). A shared resource is a resource shared and accessed by multiple nodes in a multi-node system.

Even though resources may be shared, many resources may not be used by more than one process at any given time. For example, most printers are unable to print more than one document at a time. Other resources, such as data blocks of a storage medium or tables stored on a storage medium, may be concurrently accessed in some ways (e.g. read) by multiple processes, but accessed in other ways (e.g. written to) by only one process at a time. Consequently, mechanisms have been developed which manage access to shared resources of a multi-node system.

One such mechanism is referred to herein as a two-tiered lock system. In a two-tiered lock system, for a given resource, one node in a multi-node computer system is the "master" of the resource and responsible for managing access to the resource. Access by processes in a multi-node system, whether the process is executing on the master or another node within the system, is controlled by the master of the resource. To gain access to a resource, a request must be made to the master of the resource, which may grant or deny the request. Processes on a node that is not the master (i.e. a "remote node") are not individually granted access to a resource by a master node. Rather, a slave node is granted access to a resource, and once granted, the process on the slave may access the resource.

With respect to a particular master node, processes on the master node are referred to herein as local processes; processes on a remote node are referred to herein as remote processes.

A master node uses locks to manage access rights ("rights") to a resource. A lock is a data structure that indicates whether a particular entity has requested and/or been granted a certain right to a resource. When a request for the right represented by a lock has been granted, the lock itself is referred to as being granted.

With respect to a master node, locks requested by or granted to local processes are referred as local locks while locks requested by or granted to remote processes are referred to as remote locks. Lock requests made by local processes are referred to as local lock requests and lock requests made by remote processes are referred to as remote lock requests.

Lock Types

There are many types of locks. For a given resource, a "shared lock" represents a right to share access to the resource. A shared lock may be concurrently granted to multiple processes, allowing them the right to share a form of access (e.g. read access). An "exclusive lock" may only be concurrently granted to one process. Once granted, the lock prevents this type of lock from being granted for the resource.

Due to the various permissions and guarantees associated with these locks, certain combinations of locks are not allowed to be concurrently granted. For example, if a process owns an exclusive lock on a resource, then no other process can be granted an exclusive lock or a shared lock. If a process owns a shared lock, then other processes may be granted shared locks but may not be granted an exclusive lock. Locks which cannot be combined are referred to herein as being incompatible or conflicting.

Managing Locks Using Queues

To manage the granting of locks to a resource, a master node uses queues. FIG. 1 is a block diagram showing a set of queues used by a master node to manage the granting of locks.

Referring to FIG. 1, it shows convert queue 102 and granted queue 103 for a master node N1. Master node N1 is part of a multi-node system that also includes nodes N2, N3, N4, and N5, which are not depicted. A convert queue, such as convert queue 102, holds locks for a right that has been requested but not granted. A granted queue, such as granted queue 103, holds locks that have been granted. When a master node receives a lock request from a resource, the master resource places a lock representing the request on the convert queue. When a lock is granted, the lock is placed on the convert queue.

The term queue refers to any data structure with ordered elements or entries. The entry first in the order is referred as being at the head of the queue, and the entry last in order is referred to as being at the tail of the queue. Convert queue 102, as depicted in FIG. 1, holds locks C1–C9, which are for nodes N1, N1, N2, N1, N3, N1, N1, N4, N1, respectively. The entries at the head and at the tail are locks for master node N1. Granted queue 103 holds one lock G1, which is for node N5.

Typically, entries in a queue are processed in a first-in-first-out ("fifo") basis. When an entry is removed from the head of the queue, the entry following in order moves to the head of the queue. When an entry is added to the tail of the queue, it is added as the last entry in order; the entry formerly at the end is no longer at the tail of the queue. If the lock at the head of the convert queue does not conflict with any lock in the granted queue, then the lock at the head is granted, removed from the convert queue, and added to the granted queue.

For example, lock G1 in granted queue 103 is an exclusive lock. Locks C1 and C2 are shared locks, and lock C3 is an exclusive lock. While exclusive lock G1 remains in the granted queue, shared lock C1 cannot be granted because it conflicts with exclusive lock G1. Shared lock C1 is referred to being blocked by exclusive lock G1; exclusive lock G1 is referred to as being blocking. Shared lock C2 and exclusive lock C3 cannot be granted because they follow lock C1 in the queue and are not granted before lock C1 is removed from the convert queue.

Next, the master node removes exclusive lock G1 from the granted queue, when, for example, the owner of exclusive lock G1 relinquishes the lock. The master node then grants shared lock C1, removes it from the convert queue, and adds it to the granted queue.

As a result, shared lock C2 moves to the head of the queue. Given that shared lock C1 is compatible with shared lock C2, shared lock C2 is granted, leaving exclusive lock C3 on the convert queue.

Exclusive lock C3 is not compatible with a lock on the convert queue, i.e. not compatible with shared locks C1 and C2. Exclusive lock C3 is therefore blocked.

Inherent Unfair Resource Allocation

In a two-tier lock system, some remote nodes may suffer from an inherent bias with respect to the frequency and speed at which they are added to the convert queue. Such bias is referred to herein as queuing bias. As a result of queuing bias, the remote nodes may receive an unbalanced and disproportionately lesser share of a resource relative to the extent processes on the remote nodes request the resource. There are various forms of queuing bias that stem from a variety of causes.

One form of queuing bias favors local processes. This form of queue bias occurs because of locality. Locality refers to the condition of being local on a master node. Locality gives local processes an inherent advantage in several ways with respect to frequency and speed with which locks for local lock requests are placed in a convert queue. A local process does not have to transmit a lock request to the master node using an inter-node communication mechanism, like remote nodes do. Transmitting requests in this way can involve relatively substantial time and delay. As a result, a lock request for a local process can be processed and responded to much more quickly than one from a remote node.

Second, a remote node may be restricted to only one lock on a convert queue of a master node even though multiple remote processes on the remote node have requested a remote lock. This restriction is a measure designed to reduce network traffic. For a given resource, when remote processes on a remote node request a remote lock, the lock requests are not transmitted by the remote while a remote lock exists in the convert or granted queue of the resource. A local process, however, is not subject to such a restriction. Thus, many local lock requests may be added to the convert queue in front of multiple remote lock requests while the transmission of the remote lock requests is deferred.

For example, convert queue 103 contains many locks for master node N1 but only one for each of remote nodes N2, N3, and N4. Other remote processes on N2 have made remote lock requests, which are deferred until lock C3 is granted and relinquished. Local locks C4, C6, C7, and C9 were generated for local lock requests after many of the deferred remote locks requests on node N2 were generated.

Finally, another cause of queuing bias is the relative computing power of a node and the speed at which it may communicate via inter-node communication mechanisms with the master node. Nodes with relatively higher computing power or access to a faster inter-node communication mechanism can process and transmit remote lock requests much more quickly, allowing their lock requests to be queued more frequently and swiftly.

For a resource in high demand, queuing bias alone can allow one node to horde the resource and starve other nodes of it. This causes uneven or unbalanced use of shared resource among nodes of a multi-node system that share the resource.

Inefficient Parallel Processing

Parallel processing is a very important feature of a multi-node system. Under parallel processing, a task may be performed more quickly if divided into subtasks that are each concurrently performed by a node in the multi-node system. Each node performs their respective subtask in parallel, i.e., concurrently.

Queuing bias leads to inefficient parallel processing. In general, parallel processing is performed more efficiently if all participating nodes complete their respective task at the same time. Queuing bias causes the participating nodes to complete their subtasks at different times, leading to inefficient parallel processing in a multi-node system.

Specifically, if a task to be performed in parallel involves use of resources mastered by a subset of nodes participating in the parallel execution of the task, then queuing bias favors the subset of nodes. The subset of nodes, which horde the resources from other nodes participating in the parallel execution of the task, will thus complete their respective subtasks sooner than the other nodes.

Based on the foregoing, there is a clear need for techniques that lessens adverse effects of queuing bias.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for maintaining fairness of resource allocation in a cluster environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for placing locks in a convert queue in a way that compensates for queueing bias. Rather than always placing a remote lock at the tail of a convert queue, a remote lock can be placed further up in the queue, and possibly be interleaved with local locks. As a result, remote processes are granted locks more frequently and swiftly. Locks are also placed in a convert queue based on queue placement factors, which are factors accounted for when placing a lock in a queue.

Figure 1:
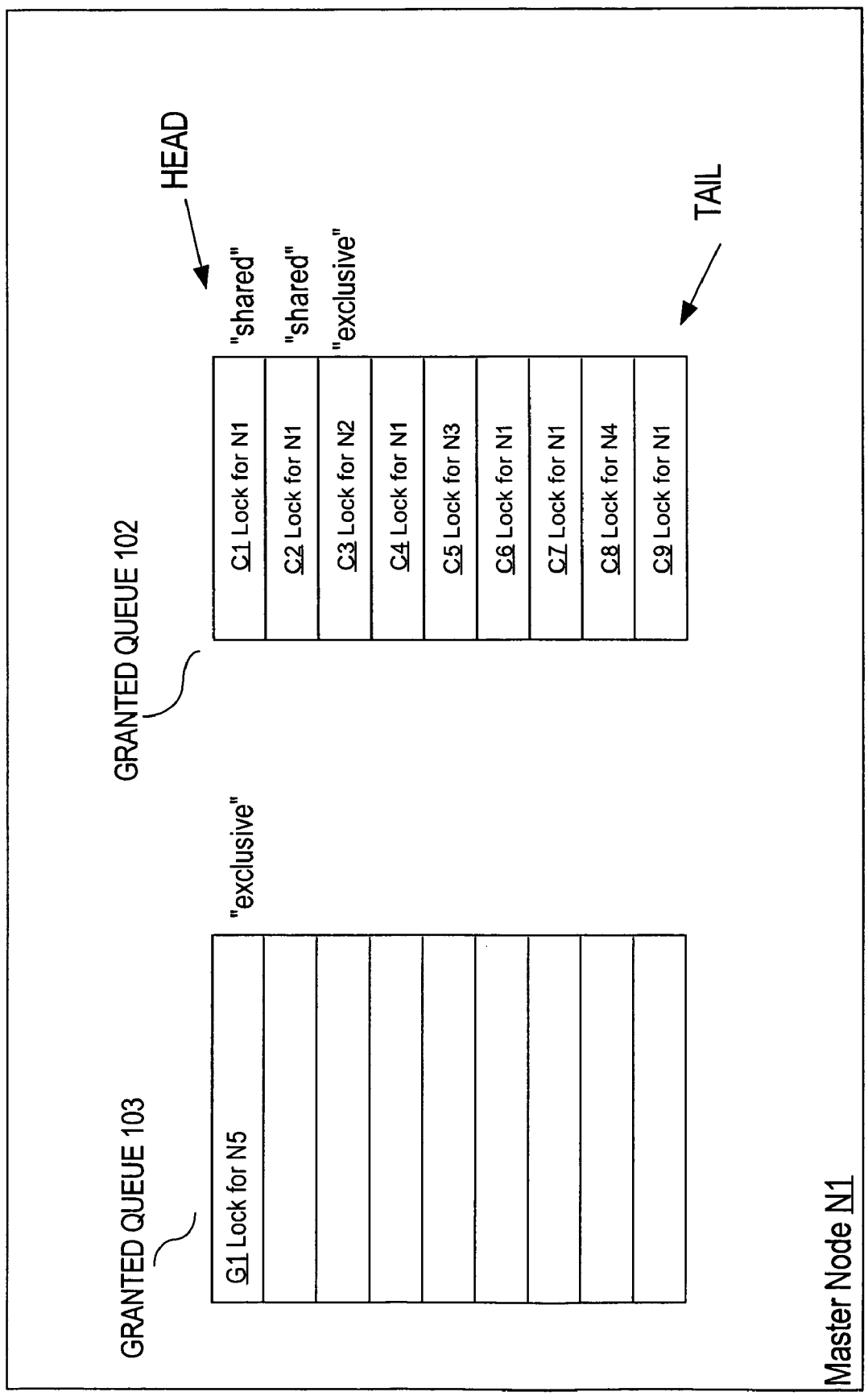
FIG. 1 is a diagram of a convert queue and a granted queue according to an embodiment of the present invention.
Figure 2:
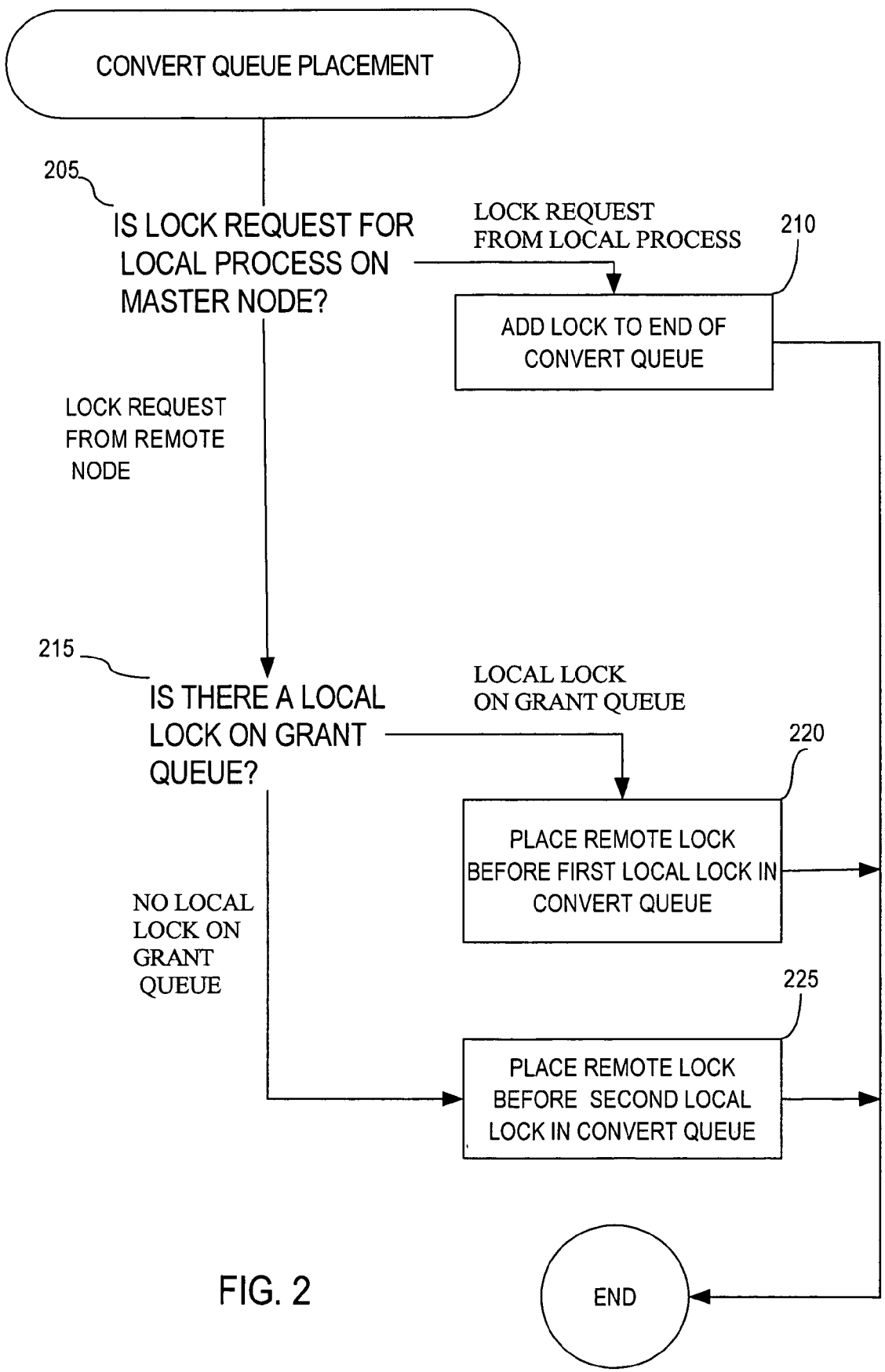
FIG. 2 is a diagram of a procedure for queue placement according to an embodiment of the present invention.

FIG. 2 is a flowchart depicting a procedure used for convert queue placement. In general, the procedure places a remote lock request in a convert queue based on the position of local locks either in the convert queue or the granted queue. The procedure ensures that there is no more than one local lock in a convert queue ahead of a remote lock. Placing remote locks further up in the convert queue in this way compensates for unfavorable queuing bias encountered by remote nodes. The procedure is performed by a master node when placing a lock within a convert queue in response to a local or remote lock request.

Referring to FIG. 2, at step 205, the master node determines whether the lock request is for a local process. If the lock request is for a local process, then at step 210, a local lock for the request is placed at the end of the queue. If the lock request is for a remote process, then execution proceeds to step 215.

At step 215, it is determined whether a local blocking lock is in the granted queue. If there is a local blocking lock in the granted queue, then execution proceeds to step 220; if there is no local blocking lock in the granted queue, then execution proceeds to step 225.

At step 220, a remote lock is placed in the convert queue before any local lock, i.e. closer to the head than any other local lock in the convert queue. If there is no local lock in the convert queue, then a remote lock is placed at the end of the convert queue. It is possible there may already be a series of remote locks ahead of the first local lock in the convert queue. In this case, a remote lock is placed after the series of remote locks but before the first local lock. Alternatively, the remote lock may be placed within a queue before and/or after any of the remote locks based on other queue placement factors, which shall be later described in further detail.

At step 225, a remote lock is placed in the convert queue before any second local lock, i.e. closer to the head than the second local lock. If there is no second local lock in the convert queue, then a remote lock is placed at the end of the convert queue. It is possible there may already be a series of one or more remote locks between the first local lock and the second local lock in the convert queue. In this case, a remote lock is placed after the series of remote locks but before the second local lock. Alternatively, the remote lock may be placed within a queue before, between, or after any of the remote locks based on other queue placement factors, which shall be later described in further detail.

Figure 3:
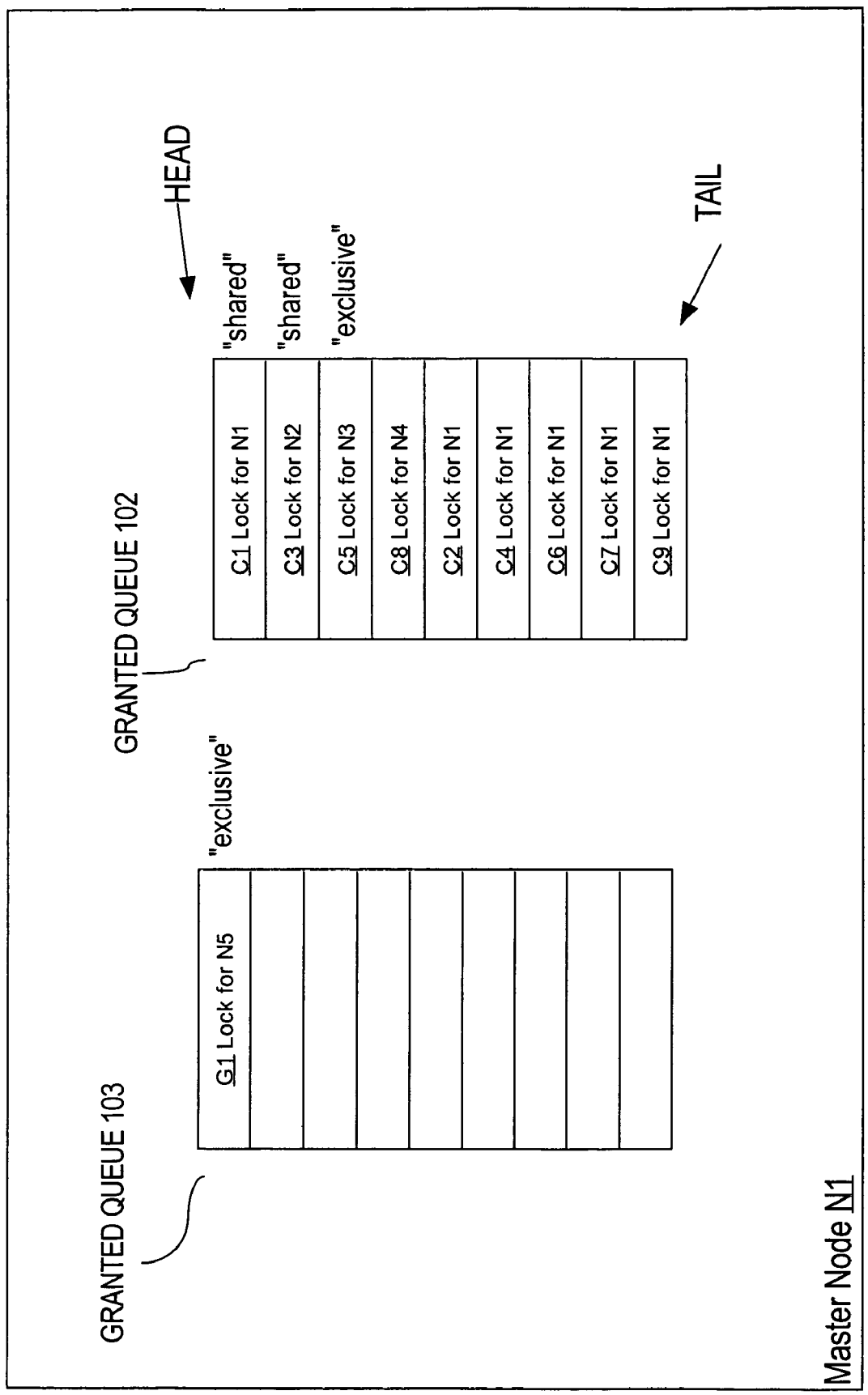
FIG. 3 is a diagram of a convert queue and a granted queue according to an embodiment of the present invention.

As a result of executing the queue placement procedure, remote locks may be interleaved between local locks. FIG. 3 shows an example of such interleaving. Because locks requests for remote locks C3, C5, and C8 were made when local lock C1 was at the head and there was no local blocking lock, at step 220 locks for N2, N3, and N4 where interleaved between local locks for master node N1, i.e. local locks C1 and C2.

Queue Placement Factors

The positions of local locks in the convert and/or granted are examples of queue placement factors. Other examples of queue placement factors include counts of locks that have been granted to a particular node and a priority designated for a node.

For example, on a given master node, a priority is designated for nodes that may request locks for resources managed by the master node. Nodes with higher priority are given preferential queue placement over nodes with lower priority. The priority may be based on such factors as the computing power of a node or the speed with which it can communicate with the master node, relative to other nodes, using an inter-node communication mechanism. Another example of a queue placement factor is a count of the number of locks that have been granted to a node.

When determining where to place a lock among a series of remote locks in the convert queue, as in for example, steps 205 and 215, a lock is placed before any lock in the series with a lower priority, or alternatively, a lower priority and higher count.

As another example, a lock request is placed in a queue behind the locks of all nodes with lesser counts, including the count of the master node. An embodiment of the present invention is not limited to use of any kind of queue placement factor or combination thereof.

HARDWARE OVERVIEW

Figure 4:
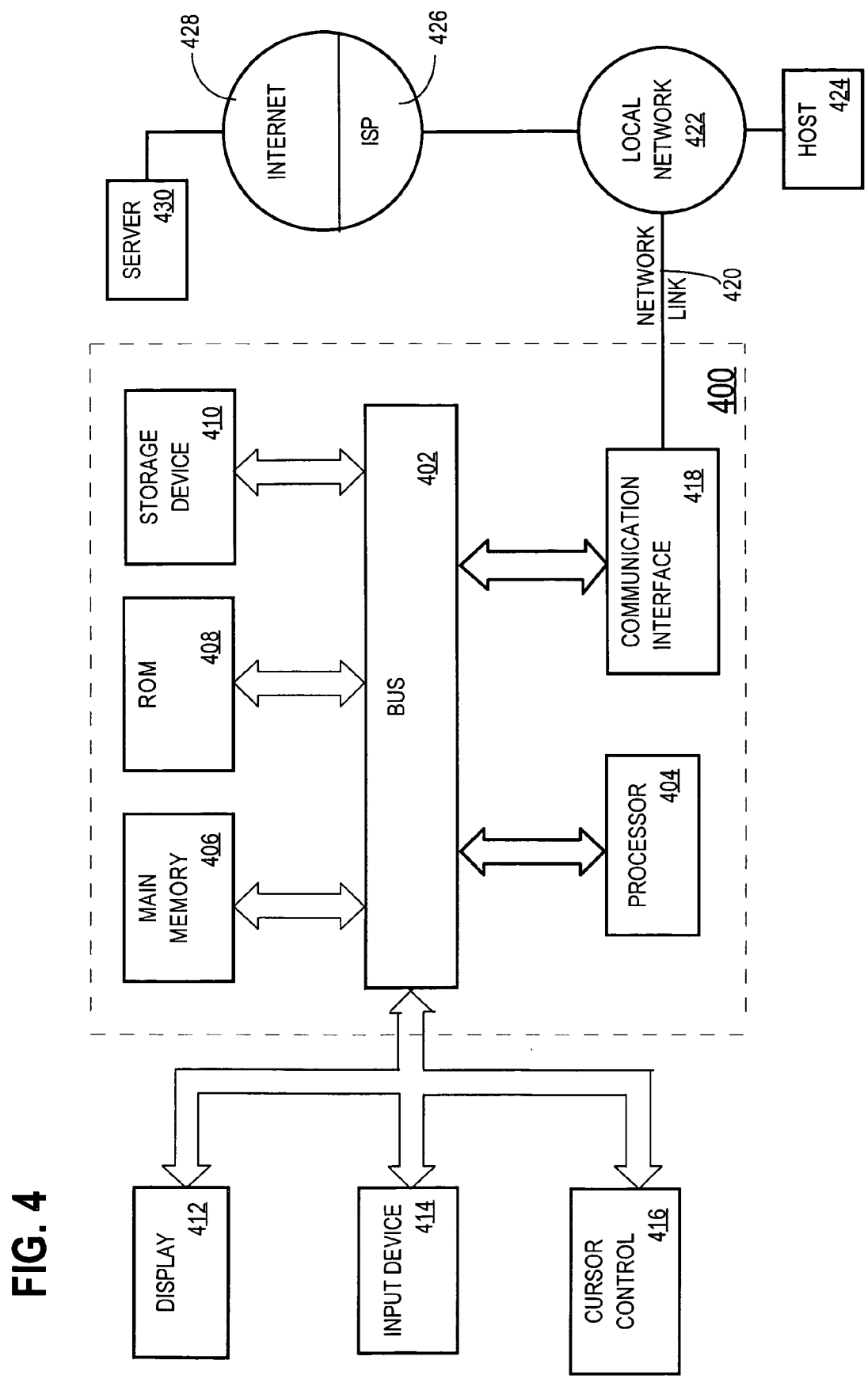
FIG. 4 is a diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing locks in a multi-node system, comprising the steps of:
    a master node receiving a request for a lock for a resource managed by the master node;
    wherein the master node maintains a convert queue that holds locks for the resource that have not been granted;
    wherein the master node maintains a granted queue that holds locks that are granted;
    determining whether the request for a lock is from a remote node or a local process local to the master node;
    the master node placing the lock within the convert queue based on a first set of one or more queue placement factors; and
    wherein the first set of one or more queue placement factors include whether:
        the lock request is from a remote node, and
        a position of one or more local locks within the convert queue or the granted queue.

2. The method of claim 1, wherein placing includes:
    if the lock request is from a remote node, then:
        determining whether there is a local lock in the granted queue; and
        if there is a local lock in the granted queue, then placing a remote lock before a local lock in the convert queue.

3. The method of claim 2, wherein placing a remote lock before a local lock in the convert queue includes:
    placing the remote lock within a series of one or more remote locks based on a second set of queue placement factors that include one or more of the following factors:
        a priority assigned to each node of a set of nodes, and
        counts of how many locks have been granted to each node of said set of nodes.

4. A computer-readable storage medium carrying one or more sequences of instructions which, when executed by one or more processors, causes the one or more processors to perform the method recited in claim 3.

5. The method of claim 2, wherein placing includes:
    if the lock request is from a remote node and if there is no local lock in the granted queue, then placing the remote lock after a first local lock in the convert queue and before a second local lock in the convert queue.

6. The method of claim 5, wherein placing the remote lock after a first local lock in the convert queue and before a second local lock in the convert queue includes:
    placing the remote lock within a series of one or more remote locks based on a second set of queue placement factors that include one or more of the following factors:
        a priority assigned to each node of a set of nodes, and
        counts of how many locks have been granted to each node of said set of nodes.

7. A computer-readable storage medium carrying one or more sequences of instructions which, when executed by one or more processors, causes the one or more processors to perform the method recited in claim 6.

8. A computer-readable storage medium carrying one or more sequences of instructions which, when executed by one or more processors, causes the one or more processors to perform the method recited in claim 5.

9. The method of claim 2, wherein placing includes:
if the lock request is from a remote node and if there is no local lock in the granted queue, then placing a remote lock at the tail of the convert queue if there is no local lock in the convert queue.

10. A computer-readable storage medium carrying one or more sequences of instructions which, when executed by one or more processors, causes the one or more processors to perform the method recited in claim 9.

11. A computer-readable medium carrying one or more sequences of instructions which, when executed by one or more processors, causes the one or more processors to perform the method recited in claim 2.

12. The method of claim 1, wherein placing includes:
if the lock request is from a remote node, then:
determining whether there is a local lock in the granted queue; and
if there is a local lock in the granted queue, then placing a remote lock at the tail of the convert queue when there is no local lock in the convert queue.

13. A computer-readable storage medium carrying one or more sequences of instructions which, when executed by one or more processors, causes the one or more processors to perform the method recited in claim 12.

14. The method of claim 1, wherein placing includes placing the lock at the tail of the convert queue if the lock request is from a local process.

15. A computer-readable medium carrying one or more sequences of instructions which, when executed by one or more processors, causes the one or more processors to perform the method recited in claim 14.

16. The method of claim 1,
wherein the convert queue contains a remote lock from a remote node; and
wherein the remote node deferred transmitting a lock request from a remote process on the remote node in response to determining that said remote lock has not yet been relinquished.

17. A computer-readable storage medium carrying one or more sequences of instructions which, when executed by one or more processors, causes the one or more processors to perform the method recited in claim 16.

18. A computer-readable storage medium carrying one or more sequences of instructions which, when executed by one or more processors, causes the one or more processors to perform the method recited in claim 1.

19. A method for managing locks in a multi-node system, comprising the steps of:
a master node receiving a request for a lock for a resource managed by the master node;
wherein the master node maintains a convert queue that holds locks for the resource that have not been granted;
wherein the master node maintains a granted queue that holds granted locks;
the master node maintaining counts of how many locks have been granted to nodes;
the master node placing the lock within the convert queue based on a first set of one or more queue placement factors; and
wherein the set of one or more queue placement factors are based on the counts.

20. A computer-readable storage medium carrying one or more sequences of instructions which, when executed by one or more processors, causes the one or more processors to perform the method recited in claim 19.

* * * * *